United States Patent

Blatt

[15] 3,640,553
[45] Feb. 8, 1972

[54] SHIELDED AIRHOSE SWIVEL WITH SAFETY PUSHBUTTON DISCONNECT

[72] Inventor: Leland F. Blatt, 790 Shoreham, Grosse Pointe Woods, Mich. 48236

[22] Filed: July 30, 1970

[21] Appl. No.: 59,522

[52] U.S. Cl. .......................................................... 285/277
[51] Int. Cl. ................................................................. F16r 37/00
[58] Field of Search ............................... 285/277, 190, 316

[56] References Cited

UNITED STATES PATENTS 3,125,360  3/1964  Ulrich .................................... 285/190

FOREIGN PATENTS OR APPLICATIONS 962,326  7/1964  Great Britain ........................ 285/316

*Primary Examiner*—Reinaldo P. Machado
*Attorney*—Cullen, Settle, Sloman & Cantor

[57] ABSTRACT

A swivel assembly for fluid conduits with a pushbutton disconnect which includes a body member having a stem member seated therein and both members are connected to fluid conduits, retaining balls seated in the stem for retaining the stem member in the body member, and a spring-biased pushbutton operatively seated in a bore of said stem member whereby the pushbutton is depressed, the retaining balls fall into a nonoperative position, thus freeing the stem member for removal from the body member; and a fluid passage is provided in the stem member for passage of fluid into the pushbutton bore to prevent release of the button when fluid pressure exists in the swivel assembly.

6 Claims, 3 Drawing Figures

PATENTED FEB 8 1972

3,640,553

INVENTOR
LELAND F. BLATT
BY Cullen, Settle, Sloman & Cantor
ATTORNEYS

SHIELDED AIRHOSE SWIVEL WITH SAFETY PUSHBUTTON DISCONNECT

REFERENCE TO RELATED APPLICATIONS

The present application is related in substance to copending and now abandoned application Ser. No. 2627, filed 1/13/70 for "Air Hose Swivel with Push Button Disconnect" and is an improvement thereover.

BACKGROUND OF THE INVENTION

This invention relates in general to an airhose swivel joint with a pushbutton disconnect mechanism which eliminates the necessity of tools ordinarily required to remove the airhose from the swivel. The swivel joint of this invention allows a quick disconnect for replacement or maintenance of certain parts. All of the lock parts are maintained in assembly, thus eliminating the loss of a vital part through the disconnect operation.

In the above identified copending application a swivel joint is disclosed comprising a pair of locking members retained in the stem of the joint and engagable in suitable recesses provided in the sleeve member of the joint to lock the two members together. The stem is provided with a pushbutton which is normally spring biased to retain the locking members in the locked position. When the button is manually depressed the locking members are permitted to drop out of the recess and into axial slots provided on the button to release the lock for quick disconnection of the joint.

The disadvantage in this construction is that the lock can be released and the joint disconnected without regard of existing fluid pressure in the joint. This provides a serious hazard for the operator or mechanic when the joint is disconnected prior to interruption of fluid pressure through the joint. Similarily, the joint in the prior application can be accidentally released by an object hitting the button, providing a similar hazard.

For the foregoing reasons the present invention has for its primary object the provision of a safety feature for such a joint to prevent release of the lock as long as fluid pressure prevails in the joint.

Therefore it is an object of this invention to provide shielded airhose swivel joint with a safety pushbutton disconnect which allows a quick disconnect for replacement or maintenance of machinery parts without the use of any special tools, but only when no fluid pressure is present in the swivel joint.

It is another object of the present invention to provide a swivel joint for fluid conduits which has internal fluid passage means to pressurize the release button in the lock position to prevent release of the lock when fluid pressure of a hazardous magnitude is present in the joint.

It is also an object of this invention to provide an airhose swivel joint which will prevent fluid hoses from twisting when they are connected to actuating machinery.

It is still further object of this invention to provide an airhose swivel joint which allows a quick disconnect yet retains all the locking parts in assembly, thus eliminating the loss of vital parts through the disconnect operation.

SUMMARY OF THE INVENTION

A swivel assembly with a pushbutton disconnect which includes a body member having a sleeve portion and a central bore extending through the sleeve portion, the central bore having an enlarged diameter groove adjacent one end of the bore. The body member also has a bore intersecting the central bore and opening to the outside. A stem member is seated in the bore of the sleeve portion, the stem member having an outer end section with bore means therein which opens to the extreme outer end of the outer section and which communicates at the opposite end of the outer section with the bore in the sleeve portion and also with the bore intersecting the sleeve portion. The stem member also has an inner end section, cylindrical in shape, having an annular groove adjacent the innermost end of the inner end section, the inner end section also having an axial bore extending therethrough and opening to the extreme outer end of the inner end section. The inner end section also has at least two transverse bores extending from the surface of the cylindrical section to the axial bore. A button is seated in the axial bore of the inner end section, the button being substantially cylindrical in shape having an annular groove adjacent the inner end thereof and an axial bore opening to the inner end thereof, with a spring seated in the axial bore. A retaining ball is seated in the transverse bores of the inner end of the stem member, the balls being confined within the bores by the surface of the button inward of the annular groove, whereby when the button is depressed to a predetermined position the balls fall into the annular groove, freeing the stem for removal.

BRIEF DESCRIPTION OF THE DRAWING

Novel features and advantages of the invention will be apparent from the following description and drawings, in which.

DESCRIPTION OF THE PREFERRED EMBODIMENT

Figure 1:
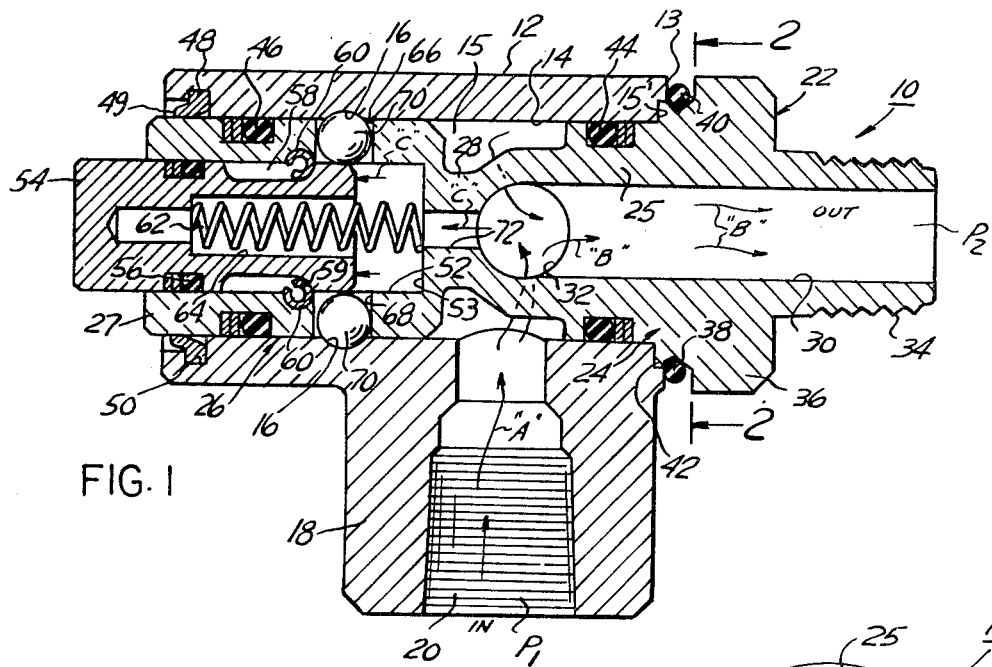
FIG. 1 is a longitudinal cross section through the air hose swivel joint of the invention, shown in the locked position.
Figure 2:
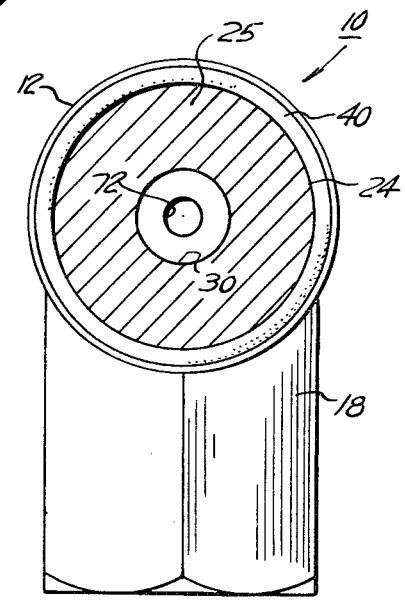
FIG. 2 is a transverse section along the line 2—2 of FIG. 1.
Figure 3:
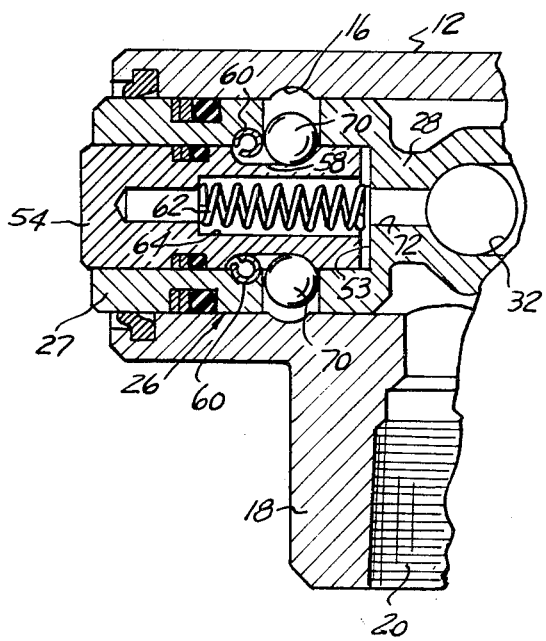
FIG. 3 is a cross-sectional view similar to FIG. 1 illustrating the swivel joint lock in the released position; broken away, fragmentarily shown.

The safety airhose swivel joint with push button disconnect of the present invention is indicated generally by the numeral 10 in FIGS. 1, 2 and 3. The improved swivel joint comprises a cylindrical sleeve 12 having an internal axial bore 14 which is provided with an annular groove 16 adjacent one end thereof for a purpose to appear hereafter. A conduit fitting 18 extends from the sleeve 12 on one side thereof, which has a central bore 20 in communication with the axial bore 14 of the sleeve. As will be understood, a fluid conduit (not shown) is adapted to be connected to the conduit fitting 18 for passage of fluid from a source of fluid under pressure (not shown) to a fluid-operated mechanism (not shown) with which the swivel joint is associated.

The bore 14 of the sleeve member 12 is adapted to receive a stem 22 which is slidably inserted therein. The stem 22 is composed of a first section 24 and a second section 26 coaxially aligned therewith and which are connected together by a reduced diameter neck portion 28 within the bore 14 of the sleeve 12 and substantially at the center thereof.

The first section 24 is provided with an axial bore 30 which terminates inside the bore 14 into a transverse passage 32 adjacent the reduced diameter neck portion 28. The reduced diameter portion 28 of the stem 22 provides an enlarged fluid chamber 15 of the bore 14 and the transverse passage 32 of the stem 22 opens into the chamber 15 to thereby provide a continuous fluid communication from the fluid inlet 20, through chamber 15, into the transverse passage 32 and out through the bore 30 of the stem 22.

The outer end of the stem 22 is provided with a threaded nipple 34 for the attachment of the fitting of a fluid conduit (not shown) to that end of the stem 22, as will be understood. Adjacent the nipple 34, the stem 22 is provided with a nut head 36 for application of a wrench when the fluid conduit fitting is threaded on the nipple 34. Behind the nut head 36, still outwardly of the sleeve 12, the stem 22 is provided with a conical surface 38 around which is disposed an O-ring seal 40 which, in assembly, is clamped between the lateral end surface 13 of the sleeve 12 and the conical surface 38 of the stem 22. The conical surface 38 is provided to cause the O-ring seal 40 to roll down into sealing abutment against the laterial surface 13 of the sleeve to thereby provide an effective external dust seal for the swivel joint assembly. Immediately adjacent the bottom of the conical surface 38, the stem 22 is provided with a radial flange 42 against which the O-ring seal 38 abuts. The radial flange 42 defines a pilot portion for engagement within a radial recess 15' in the lateral end surface 13 of the sleeve 12.

This external sealing arrangement at the fluid outlet end of the stem 22 provides an improved feature of the present invention, which effectively prevents entrance of dust or other contaminants into the bore 14 of the sleeve 12.

The primary cylindrical body portion 25 of the first section 24 is fitted within the bore 14 and is provided with an external seal assembly 44 for sealing engagement against the internal surface of the bore 14 to prevent escape of fluid from the chamber 15 along the body portion 25 of the stem. However, the internal seal assembly 44 and external O-ring seal 40 are constructed such as to release excess fluid pressure from the fluid chamber 15 which is permitted by means of the O-ring seal 40 being disposed around the external conical surface 38, causing the O-ring seal 40 to be displaced upwardly on the conical surface 38 for release of the excess fluid pressure to the atmosphere without permitting dirt or dust to enter the bore 14 behind the seal assembly 44, which would have an undesirable wear effect on the seal assembly 44.

The other coaxial stem section 26 is disposed within the other end of the sleeve 12 and comprises a cylindrical body portion 27 which is fitted within the bore 14. The cylindrical body portion 27 is likewise provided, internally of the bore 14, with a seal assembly 46, which is similar to the seal assembly 44, so that the fluid chamber 15 is sealed off at both ends of the bore 14. The end of the sleeve 12 is provided with a seal 48 disposed within a radial recess 50. The seal 48 has a flexible sealing lip portion 49, which extends axially outwardly in sealing contact with the external radial surface of the cylindrical body portion 27. By the disposition of the sealing lip 49 axially outwardly foreign matters are effectively prevented from entering the bore 14, but at the same time the sealing lip 49 permits excess fluid pressure from the fluid chamber 15 to be bled off into the atmosphere. Thus, it will be seen that by the incorporation of these improved features an effective bleedoff arrangement is provided at both open ends of the bore 14, which functions in a manner similar to the function of a one-way valve.

The cylindrical body portion 27 is provided with an axially centered blind bore 52 which terminates into a blind end 53 adjacent the reduced diameter neck portion 28 of the stem.

The blind bore 52 is adapted to reciprocably receive a plunger or button 54 provided with a radial seal assembly 56 for sealing engagement against the internal surface of the blind bore 52. Between the seal assembly 56 and the inner end of the button 54, the button is provided with an axially extending groove 58. The inner end of the groove 58 comprise a shoulder 59 adapted for abutment against a pair of retainer pins 60 inserted transversely within the body portion 27 for partial extension into the blind bore 52, to thereby limit the outward movement of the button 54.

The button 54 is normally retained in the outward extended position against the retaining pins 60 as shown in FIG. 1, by a bias means such as a coil spring 62 disposed within a cylindrical recess 64 in the button 54 and which other end rests in the blind end 53 of the bore 52. Thus, by expansion of the spring 62 the button 64 is retained outwardly.

The cylindrical body portion 27 of the stem section 26 is provided with a pair of oppositely disposed axially aligned radial apertures 66 and 68, respectively, which are located such that, when the stem 22 is assembled into the sleeve 12 the apertures 66 and 68 will be aligned with the internal annular groove 16 within the sleeve 12. Each of the apertures 66 and 68 is adapted to receive a moveable lock element, such as a ball 70, for disposal therein. The diameter of the balls 70 is such that, in the position of the lock mechanism illustrated in FIG. 1 in which the button 54 is extended outwardly, the balls 70 are moved upwardly in their respective apertures 66 and 68 by camming action of the radial surface of the inner end of the button 54, so that portions of the balls extend into the annular groove 16 of the sleeve 12 thereby locking the stem 22 securely within the sleeve 12.

With reference to FIG. 3, in order to normally release the lock, the button 54 is depressed manually inwardly of the cylindrical portion 27 against the force of the spring 62, which moves the inner end of the button 54 away from underneath the balls 70, causing the balls to drop into the radial groove 58 of the button and out of the annular groove 16, permitting the stem 22 to be removed from the sleeve 12. Obviously, this arrangement provides an effective, quick connect and disconnect mechanism for the swivel joint.

The improved swivel joint of the present invention is provided with an important safety feature to prevent premature or accidental release of the lock under fluid pressure condition within the joint. To this end, an axial passage 72 is provided, extending through the reduced diameter neck portion 28 of the stem and which is in communication with the transverse passage 32 and the interior of the blind button bore 54.

In operation and with reference to FIG. 1, fluid pressure is applied through the inlet bore 20, as indicated by the flow arrows designated "A", for passage into the fluid chamber 15 of the sleeve 12. From the fluid chamber 15 the fluid passes through the transverse bore 32 into the bore 30 of the stem 22 for exit out of the joint, as indicated by the flow arrows designated "B". However, a portion of the fluid is diverted through the passage 72 in the neck portion 28 of the stem and into the blind bore 52 behind the release button 52, as indicated by the flow arrows designated "C". Thus, fluid pressure is exerted on the rear end of the button 54 to compliment the expansion force of the spring 62 to maintain the button in the outward lock position, as shown in FIG. 1. The magnitude of the fluid pressure acting on the button 54 will, of course, be dependent on the particular operational function and application requirements and can be varied by variation in the diameter of the passage 72.

Thus, as long as fluid pressure prevails in the fluid chamber 15, as applied through the inlet 20, the button 54 cannot be depressed inwardly to release the lock. With reference to FIG. 3, as fluid pressure through the swivel joint is reduced to a low, safe magnitude or completely cut off to provide zero pressure, the button 54 can be depressed to permit the lock members 70 to drop into the groove 58 of the button, permitting the stem 22 to be removed from the sleeve 12.

It will be seen from foregoing description and attached drawing that the present invention provided an improved, externally sealed swivel joint having a safety push button disconnect providing a lock means which cannot accidently or prematurely be released as long as fluid pressure of a hazardous magnitude prevails within the joint, to thereby effectively prevent explosion of the joint, such as occurs if the joint would be disconnected under fluid pressure, causing injury to the operator.

Additionally, the present improved swivel joint provides improved external sealing arrangements at both ends of the stem, which effectively prevents the entrance of foreign matters into the joint, but at the same time permit bleedoff of excess fluid pressure in the fluid chamber of the joint, thereby preventing a pressure build up between the two internal seals of the joint, which would create high friction and adversely affect the ease of rotation of the swivel joint.

Although the present invention has been described by means of a preferred embodiment, it will be obvious to anyone skilled in the art to which the invention pertains to make certain changes in detail and arrangement without departing from the spirit and essential characteristic of the present invention as defined by the scope of the appended claims.

What is claimed:

1. A swivel joint assembly with a pushbutton disconnect comprising a body member having a sleeve portion and a central bore extending through said sleeve portion, said central bore having an internal radial groove adjacent one end of said bore, said body member having a first fluid conduit in communication with said bore to convey fluid under pressure into said bore;

a stem member seated in said bore of said sleeve portion, said stem member comprising a first end section having bore means therein comprising a second fluid conduit which communicates at the opposite end of said first section with said bore in said sleeve portion and also with said first fluid conduit, a second end section cylindrical in shape and integrally connected to said first section by a reduced diameter neck portion centrally within said sleeve bore defining a fluid chamber, said second end having an axial blind bore and transverse apertures extending from the exterior surface thereof to said axial blind bore, a button seated in said blind bore of said second end, said button having an annular groove adjacent the inner end thereof and a cylindrical recess opening to the inner end thereof, said button having a spring seated in said cylindrical recess to normally bias said button outwardly of said bore, means for retaining said button in said blind bore, retaining means disposed in said transverse apertures in said second end of said stem member, said retaining means being confined within said apertures by the surface of said button at the inner end when said button is biased outwardly for extension of said retaining means within said internal radial groove of said sleeve to thereby lock said stem in said sleeve, whereby when said button is depressed to a predetermined position said retaining means fall into said annular groove in said button to release said stem for removal from said sleeve; and means fluidly connecting said first and second fluid conduit with said button retaining blind bore to pressurize said button outwardly in locking position upon conveyance of fluid under pressure through said first and second fluid conduits.

2. In the assembly of claim 1, the further provision of a pair of spaced apart annular seal assemblies disposed around said stem internally of said sleeve bore and to both sides of said fluid chamber to prevent escape of fluid from said fluid chamber under normal predetermined fluid pressure conditions.

3. In the assembly of claim 2, the further provision of a first sealing means externally of said sleeve adjacent one end thereof comprising an O-ring disposed around said stem seated on a conical surface provided on said stem to cause said O-ring to slide downwardly into sealing engagement with said end of said sleeve.

4. In the assembly of claim 3, the further provision of a second sealing means adjacent the other end of said sleeve and internally confined therein comprising a lip portion in sealing engagement with said stem and extending axially outwardly, the improvement comprising said pair of spaced internal seal assemblies cooperating with said first and second sealing means to bleed fluid from said fluid chamber in excess of said predetermined fluid pressure.

5. In the assembly of claim 1, said means fluidly connecting said first and second fluid conduit with said button retaining blind bore comprising an axial passage extending through said reduced diameter neck portion.

6. The assembly of claim 1 wherein said means of retaining said button in said blind bore in said second end section comprises at least one pin extending through a transverse bore in said second end section and traversing an arc portion of said blind bore for extension into said groove of said button.

* * * * *